(12) United States Patent
Mathieu

(10) Patent No.: US 12,545,306 B2
(45) Date of Patent: Feb. 10, 2026

(54) DOOR CLOSURE MONITORING SYSTEM

(71) Applicant: POMA, Voreppe (FR)

(72) Inventor: Christian Mathieu, Seyssins (FR)

(73) Assignee: POMA, Voreppe (FR)

( * ) Notice: Subject to any disclaimer, the term of this patent is extended or adjusted under 35 U.S.C. 154(b) by 791 days.

(21) Appl. No.: 17/818,008

(22) Filed: Aug. 8, 2022

(65) Prior Publication Data

US 2023/0045835 A1 Feb. 16, 2023

(30) Foreign Application Priority Data

Aug. 11, 2021 (FR) ...................................... 2108643

(51) Int. Cl.
| | | |
|---|---|---|
| B61L 27/57 | (2022.01) | |
| B61B 1/02 | (2006.01) | |
| B61B 7/00 | (2006.01) | |
| B61B 12/00 | (2006.01) | |
| B61B 12/06 | (2006.01) | |
| B61D 19/02 | (2006.01) | |

(52) U.S. Cl.
CPC ................ B61L 27/57 (2022.01); B61B 1/02 (2013.01); B61B 7/00 (2013.01); B61B 12/002 (2013.01); B61B 12/06 (2013.01); B61D 19/02 (2013.01)

(58) Field of Classification Search
CPC ......... B61B 12/002; B61B 12/06; B61B 7/00; B61B 1/02; B61D 19/026; B61D 19/02; B61L 27/57
See application file for complete search history.

(56) References Cited

U.S. PATENT DOCUMENTS

| | | | | |
|---|---|---|---|---|
| 5,936,232 | A | * | 8/1999 | Saretzky .................. G01V 8/12 250/221 |
| 7,490,841 | B2 | * | 2/2009 | Castello ............... B61D 19/026 280/274 |
| 11,447,999 | B2 | * | 9/2022 | Uno ......................... E05F 15/60 |
| 2020/0101986 | A1 | * | 4/2020 | Mohr .................... B61B 12/002 |
| 2021/0180390 | A1 | * | 6/2021 | Tokudome .............. E05F 15/73 |

FOREIGN PATENT DOCUMENTS

| | | | | | |
|---|---|---|---|---|---|
| EP | 2067682 | A1 | * | 6/2009 | ........... B61B 12/002 |
| EP | 2067682 | B1 | | 10/2013 | |
| EP | 3502389 | A1 | * | 6/2019 | ........... B61D 19/026 |
| FR | 3017357 | A1 | * | 8/2015 | ........... B61D 19/026 |
| JP | H04339067 | A | * | 11/1992 | |
| JP | 5348981 | B2 | * | 11/2013 | |
| KR | 20170071304 | A | * | 6/2017 | |

* cited by examiner

*Primary Examiner* — Cheng Lin
(74) *Attorney, Agent, or Firm* — Chiesa Shahinian & Giantomasi PC

(57) ABSTRACT

The invention refers to a system for monitoring the position of the doors of a moving car in a cable transportation system, the car comprising two doors and the monitoring system comprising an electronic control unit. The monitoring system comprises a detection target on each door, and a fixed detection device, such as a proximity switch with a field of action, which emits a detection signal when a target passes through the field of action, which is connected to the control unit and is positioned so that it can emit a detection signal when the car passes through a control zone. The control unit determines that the two doors of the car are correctly positioned if the distance between the two doors is less than a predetermined opening threshold.

13 Claims, 2 Drawing Sheets

DOOR CLOSURE MONITORING SYSTEM

CROSS REFERENCE TO RELATED APPLICATIONS

This application claims priority to French Patent Application No. 2108643, filed Aug. 11, 2021, the disclosure of which is incorporated herein by reference in its entirety.

FIELD

The invention refers generally to the technical field of systems designed to transport persons by overhead cable car, in particular ski lifts used at ski resorts or for public transport in urban environments.

This invention refers more specifically to a system that ensures that the doors of the cars in such a cable transportation system are properly closed.

BACKGROUND

A cable car transportation system is a continuously moving (e.g., running at up to 5-7 m/s) apparatus that has a plurality of cars arranged along an overhead haul rope. Each car can carry a certain number of passengers, typically 2 to 10 passengers.

In a known fashion, each cable car has two doors (also called gates) that open and close automatically while the car is passing through departure and arrival terminals (also called stations) to allow passengers to descend and ascend a ski slope. The opening and closing movement of the two doors can be sliding or swiveling. The term sliding means that the movement of the two doors is only along one axis (called the opening/closing axis), while the term swiveling means that the two doors also make a slight movement in a perpendicular axis, usually to move outwards from the car shell during the opening process In the most common embodiment, the cars are said to be disengageable from the main cable car haul rope, i.e. each car has a disengageable attachment (or clamp) that can be disconnected from the cable car haul rope while in the stations. However, on most installations, even if they are disengaged from the haul rope, the cars are still moving at a low speed (e.g. 0.3 to 0.5 m/s) during passenger boarding and alighting operations, so as to minimize the time spent in stations.

The opening and closing of the car doors are generally performed automatically in the station once the car has been disengaged, for example using mechanical means such as springs and cog wheels. However, before recoupling the car to the haul rope at the station exit, it is necessary to ensure, for obvious safety reasons, that the car doors are closed, or more precisely that they are in an appropriate position. In fact, in order to enable the re-coupling of the car to the haul rope when leaving the station, it is acknowledged that the doors of a car may not be completely closed but may have a small gap between them in order to be considered as closed.

This door position monitoring procedure is carried out when the car is travelling at low speed in a zone called the verification zone. If this monitoring operation is not conclusive (i.e. if the doors are not correctly positioned), the car is obviously not reconnected to the haul rope and a door opening error is signaled.

Door monitoring systems already exist that use mechanical means in close contact with the car doors to monitor their closure. However, these means are rather difficult to install and adjust, and are more suitable for doors with a swiveling motion than for those with a sliding motion.

Document EP2067682 describes a door monitoring system that includes locking and detection means located inside the car, as well as electronic communication means for transmitting information about the detection means to a central point in the station, in order to enable or disable departure of the car. But with such a system, it is necessary that each of the cars of the transportation system be equipped with detection and communication means.

SUMMARY

Therefore, this invention seeks to remedy all or part of the disadvantages of the state of the art by proposing a system for monitoring the door position of the cars of a cable car that is easy to implement and that does not include electronic means inside each car. The invention reduces cost, simplifies the solution, and is also well adapted to sliding doors.

To this end, the invention describes a system for monitoring the position of the doors of a moving car in a cable transportation system, the car comprising two doors and the monitoring system comprising an electronic control unit. The monitoring system is characterized in that it comprises a detection target on each door and a fixed detection device, of the proximity sensor type, equipped with a field of action and emitting a detection signal when a target passes within the field of action, which is connected to the control unit and which is placed so as to be able to emit a detection signal when the car passes through a control zone, and in that the control unit decides that the two doors of the car are correctly positioned if the gap between the two doors is less than a predetermined opening threshold.

According to one feature, the detection device comprises two fixed sensors, and the control unit will determine that the two doors of the car are properly positioned if it receives a detection signal from both sensors simultaneously during the passage of the car through the control zone.

According to another feature, the detection device has a single fixed sensor and the control unit decides that both doors of the car are correctly positioned if it receives a first detection signal from said sensor and then a second detection signal after a time shorter than a said maximum time.

According to another feature, the control unit measures the position of the car in the detection area to determine the maximum time.

According to another feature, if the control unit determines that the two doors are not properly positioned when the car passes through the control zone, then it signals a failure to properly open the car doors. The control unit issues a command to stop the car if the doors fail to open.

According to another feature, the targets are passive and do not require a power supply.

According to another feature, the targets are magnetic targets and the sensors are magnetic proximity switches, or the targets are metallic targets and the sensors are inductive proximity switches, or the targets are reflective targets and the sensors are photoelectric switches.

The invention also describes an overhead cable transportation system of the cable car type comprising a plurality of cars, characterized in that the transportation system comprises a system for monitoring the position of the doors of the various cars in the system.

BRIEF DESCRIPTION OF THE DRAWINGS

Other features and further advantages of the invention will become apparent from the following description, with reference to the appended figures in which.

DETAILED DESCRIPTION

Figure 1:
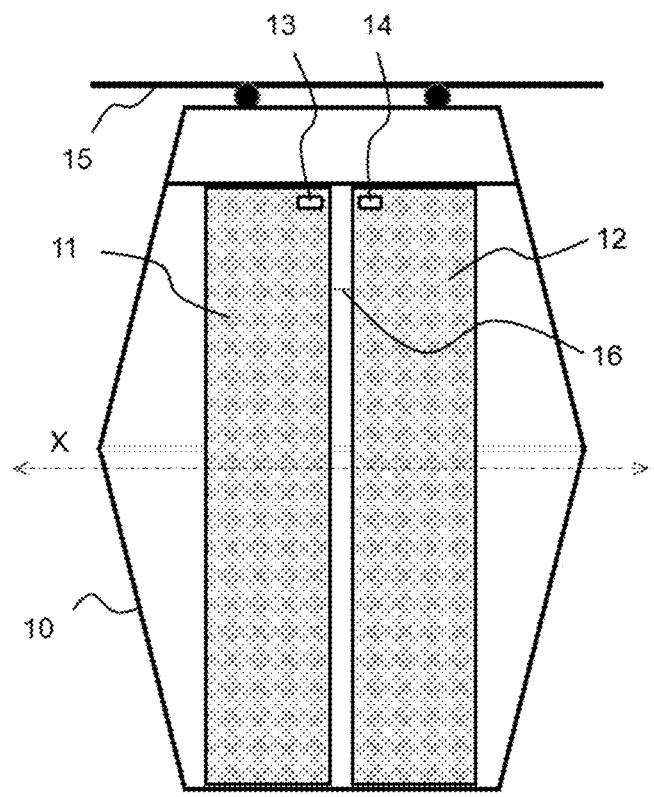
FIG. 1 shows a simplified schematic view of an example of a car according to the invention.
Figure 2:
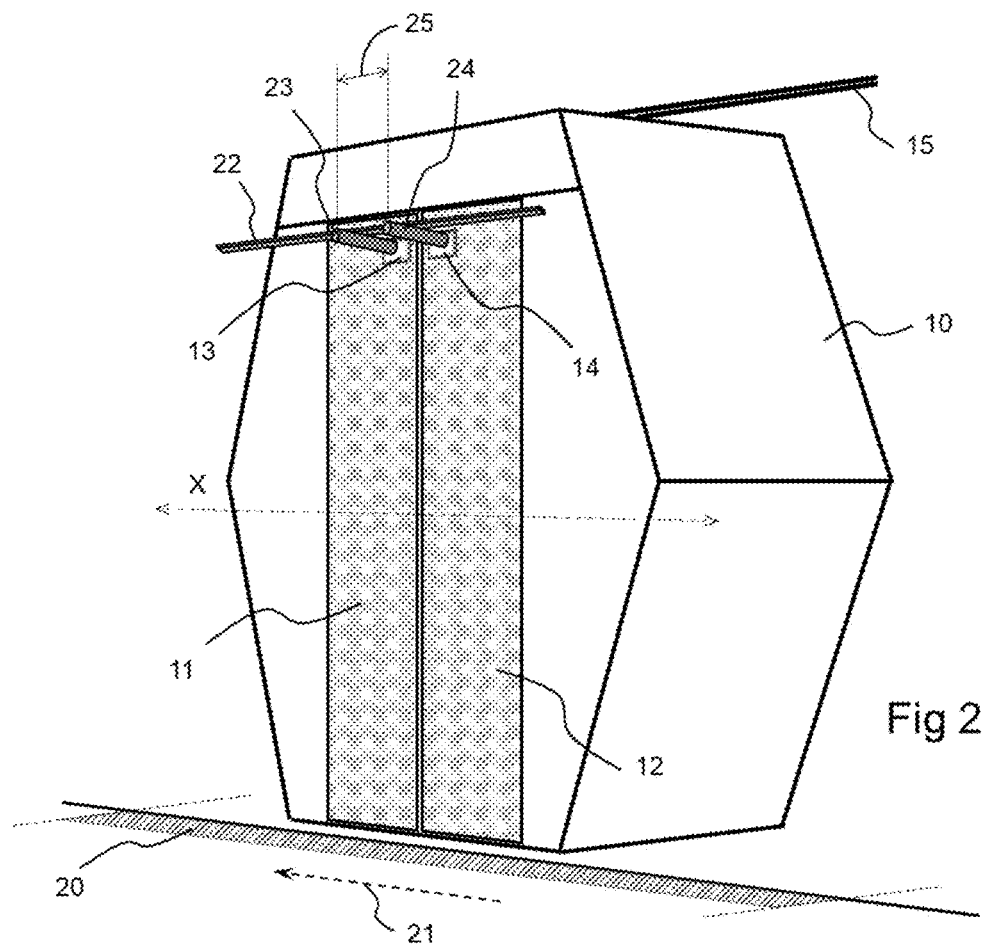
FIG. 2 depicts said car in its environment in the control zone of a cable car station, according to a first embodiment.

FIGS. 1 and 2 show a car 10 used in an overhead cable car transportation system. The system includes a large number of cars that are driven by a main haul rope and are disengageable when the cars are in the various stations of the system. Each car 10 has two movable doors, in this case a first door 11 and a second door 12. Preferably, the two doors slide along an axis X, substantially parallel to the direction of movement of the car 10. The car 10 is for example suspended from a track 15 when it circulates in the station and when it is disengaged from the main hauling cable.

When the car 10 passes through a station, the opening and closing of the doors 11 and 12 are triggered automatically by known means not shown in the figures. However, before the departure of each car from a station, the cabin has a system for monitoring the position of the doors of the car to ensure that the doors are closed, or more precisely that they are correctly positioned.

For the purpose of this document, the doors 11 and 12 of the car 10 are said to be well positioned to allow the departure of the car 10 from the station, if there is a gap 16 between the doors 11 and 12 that is less than a predetermined opening threshold S. The standards currently in force authorize a maximum opening gap of 110 mm between the doors of a car to allow the car to be recoupled to the haul rope, but a transportation system can obviously set an opening threshold S lower than this maximum threshold imposed by the standards.

The control system comprises an electronic control unit not shown in the figures, for example a computer, programmable logic controller or equivalent type. The control unit is placed in the station and is in charge of checking the correct position of the car doors when the car 10 passes through a zone called control zone 20. In this control zone 20, the car is mobile and circulates at low speed along a direction 21 which is substantially parallel to the X axis. The control zone 20 is preferably located after the passengers have boarded the car 10 and before the car 10 is recoupled to the main haul rope for a departure from the station.

If the control unit determines that the doors 11, 12 are not well positioned, i.e. that they are opened too wide because the gap 16 is greater than the predetermined opening threshold S, then the control unit signals an opening error by various conventional means (alarm, error message, . . . ) and can also order the shutdown of the car 10 so that a human intervention can take place.

To this end, the invention stipulates that doors 11, 12 each comprise a detection target 13, 14. In this case the first door 11 comprises a first target 13 and the second door 12 comprises a second target 14. Preferentially, the targets 13, 14 are passive and therefore advantageously do not require a power supply in the cabin. However, active targets could also be possible, for example powered by battery.

The monitoring system also includes a detection device that is mounted in the station and is connected to the control unit. This detection device includes one or more sensors that are of the proximity detector type, i.e. equipped with a field of action (also called detection lobe) and emitting an electrical detection signal when a target is located in its field of action.

In a first preferred embodiment described in FIG. 2, the fixed detection device comprises two separate and generally identical sensors 23, 24 that are attached to, for example, a bar 22, but other attachment is certainly possible.

The first sensor 23 is positioned to be able to detect the first target 13 during the passage of the car 10 through the control zone 20 and the second sensor 24 is positioned so as to be able to detect the second target 14 during the passage of the car 10 through the control zone 20. Thus, when a target 13, respectively 14, passes near the fixed sensor 23, respectively 24, the control unit receives an electric signal from this sensor 23, respectively 24.

According to the invention, the control unit determines that the doors 11, 12 of the car 10 are correctly positioned if and only if the control unit simultaneously receives an electrical signal from the two sensors 23, 24 at a given instant during the passage of the car 10 through the detection zone 20. In fact, at this given instant, the two targets 13, respectively 14, are placed opposite the two sensors 23, respectively 24, and therefore that the gap 16 between the doors 11 and 12 is less than the opening threshold S.

The adjustments to the height and depth positioning of the two fixed sensors 23, 24 are therefore important so that the targets 13, respectively 14, enter well into the field of action of their corresponding sensor 23, respectively 24, when the car 10 goes through. Moreover, the adjustment of the distance 25 between the two sensors 23, 24 along the X axis is essential because this distance 25 determines the value of the opening threshold S which is accepted by the control unit so that the two car doors are considered to be well positioned. It is recalled that the doors are considered to be well positioned if their opening gap 16 is less than the opening threshold S, i.e. the accepted value of the gap 16 can go from 0 (meaning that the doors are completely closed) to the threshold S.

As the sensors 23, 24 are attached to the station floor and the targets 13, 14 are attached to the doors 11, 12, this means that the value of the opening threshold S is a function of the distance 25 between the two sensors 23, 24 and that the permissible value of the gap 16 between the doors is a function of the width of the targets 13, 14 (obviously not taking into account the width of the detection beam of the sensors 23, 24). For example, in order to obtain an acceptable gap between 0 and a threshold S equal to 110 mm, each target 13, 14 must have a width equal to 55 mm along the axis X.

Furthermore, in order to provide a certain tolerance in terms of height, all the targets 13, 14 preferably have a significant enough height along an axis perpendicular to X to compensate for a possible vertical shift of the car 10, in particular as a function of the number of passengers on board the car. For example, the height of the targets 13, 14 is about 25 mm. Thus, the targets 13, 14 come within the field of action of their respective sensor regardless of the weight of the car 10.

When the mobile car 10 passes through the control zone 20 in the direction 21, the operation proceeds as follows:

a) Before the arrival of the car 10, none of the sensors 23, 24 are obviously located in front of a target 13, 14, so the control unit does not receive a signal.

b) At a given moment, the first door 11 will pass in front of the second sensor 24, which will thus detect the passage of the first target 13 in its field of action while the first sensor 23 does not yet detect anything. So the control unit only receives a signal from the second sensor 24.

c) Then, the first target 13 will go out of the field of action of the second sensor 24 to then enter the field of action of the first sensor 23. If, at a given moment, the second sensor 24 detects that the second target 14 is also in its field of action, then it indicates that the distance between the doors 11, 12 is lower than the opening threshold S. The controller then receives a signal from both sensors 23, 24 simultaneously and determines that the doors are correctly positioned. If, on the contrary, the doors 11 and 12 are too far open, then the first target 13 will leave the field of action of the first sensor 23 before the second target 14 enters the field of action of the second sensor 24. The control unit will therefore never simultaneously receive a signal from both sensors 23, 24, and it will be able to signal a failure to open the doors of the car 10.

d) Finally, at the end of the passage of the car 10 into the control zone 20, the first sensor 23 detects the passage of the second target 14 but the second sensor 24 no longer detects anything.

The entry and exit of the car 10 into and out of the control zone 20 may be signaled to the control unit via any known sensing means. This allows the control unit to determine that a car 10 is present in the control zone 20 and to monitor whether both sensors 23, 24 have simultaneously sent their signal during the passage of the car 10 between entry and exit of the control zone 20.

Preferentially, the targets 13 and 14 are simple magnetic plates and the sensors 23, 24 are magnetic proximity detectors. This solution is simple, inexpensive and allows a field of action of the sensors up to a distance of about 100 mm, which allows the sensors to be moved away from the targets. Nevertheless, other variants are quite feasible, such as using metallic targets with inductive proximity detectors or reflective targets with photoelectric proximity detectors.

Moreover, if the field of action of the detection device is sufficiently large in relation to the movement of the doors along the axis perpendicular to X, the invention can also be adapted to cars with swiveling doors.

In the example shown in the figures, the targets 13, 14 are placed at the top of the doors and at the same height in relation to each other, as well as the sensors 23, 24. However, other alternatives are feasible, such as having a first target 13 fixed on the first door 11 at a different height in relation to the second target 14 and therefore respectively a first sensor 23 at a different height in relation to the second sensor 24. This prevents the first sensor 23 from detecting the second target 14 and conversely the second sensor 24 from detecting the first target 13, during the passage of the car 10 in the detection zone 20 (see cases b and d) described above). However, this alternative does not really improve the described procedure because, regardless of the configuration of the targets, the important condition in this first embodiment for the control unit is always to simultaneously receive a signal from both sensors 23, 24 at a given time when the car 10 passes into the detection zone.

Figure 3:
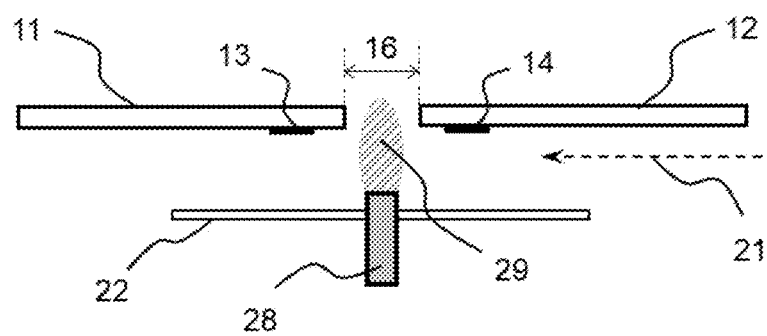
FIG. 3 shows a diagram relating to another embodiment of the invention.

In a second embodiment that is detailed in FIG. 3, the sensor device includes only a single fixed proximity type sensor 28. This sensor 28 may be similar to the two sensors 23 and 24 described above. In the station, the sensor 28 may be attached, for example, to the bar 22 as seen previously, but other attachments are feasible. The fixed sensor 28 is positioned so that it can detect the first target 13 and then the second target 14 when the car 10 passes through the control zone 20. Thus, when a target 13, respectively 14, passes within the field of action 29 of the sensor 28, the control unit receives an electrical detection signal from this sensor 28.

The procedure then involves the following sequence: when the car 10 passes into the detection zone 20 in the direction 21, the first target 13 of the first door 11 will pass into the field of action 29 of the sensor 28 which therefore sends a first detection signal S1 to the control unit. Then the first target 13 will leave the field of action 29 of the sensor 28 which stops the first signal S1. Then, the second target 14 of the second door 12 will in turn pass into the field of action 29 of the sensor 28 which then sends a second detection signal S2 to the control unit.

In this second embodiment, the control unit determines that the doors 11, 12 of the car 10 are well positioned when the car 10 passes through the detection zone 20 if and only if the first detection signal S1 and the second detection signal S2 are spaced apart by a time T that is less than a maximum time. This maximum time is a function of the position of the targets 13, 14 on the doors 11, 12, of the predetermined opening threshold S and of the speed V of the car 10 in the detection zone 20.

As the car 10 generally passes at a constant speed through the detection zone 20, it would be sufficient to use this constant speed to determine the speed V of the car 10 and thus the maximum time. Nevertheless, it is preferable to calculate the actual speed of the car 10 to obtain better accuracy. For this purpose, the control unit can advantageously receive information in real time that represents the position of the car 10, for example thanks to an incremental encoder on the rail 15 or other known means. Thus, the control unit is always aware of the actual speed V of the car 10 passing through the control zone 20 and can therefore, from the time T measured between the two signals S1 and S2, deduce the actual gap 16 between the two doors 11, 12 so as to check whether it is less than the predetermined opening threshold S, and therefore that the doors 11, 12 are correctly positioned.

Furthermore, as described in the first embodiment, the entry and exit of the car 10 into the control zone 20 may be signaled to the control unit via any known detection means. This allows the control unit to determine when to monitor the reception of both signals S1 and S2.

Thus, thanks to the invention, the part of the monitoring system which is mounted in each car is very limited since it only comprises a target on each door, without any on-board electronics, without any particular mechanical means on the ground. Moreover, the targets are preferentially passive, which also avoids the need for a power supply. In both embodiments, the invention is therefore very economical, easy to implement and requires no maintenance. In particular, no communication or electrical connection between the individual cars and the control unit in the station is required for this monitoring system.

Naturally, the invention is described in the foregoing as an example. It is understood that a person skilled in the art is capable of implementing various alternative embodiments of the invention without deviating from the scope of the invention.

What is claimed is:

1. A system for monitoring the position of the doors of a moving car in a cable transportation system, the car comprising two doors and the monitoring system comprising an electronic control unit, characterized in that the monitoring system comprises:

a detection target on each door and a proximity detector fixed detection device, with a field of action capable of emitting a detection signal when a target passes through the field of action, the detection device being connected to the control unit and, said detection device being placed in such a way as to be able to emit a detection signal when the target of each door of the car passes through a control zone, and in that the control unit determines, based on the detection signal emitted when the target of each door of the car passes through the control zone, that the two doors of the car are correctly positioned if a gap between the two doors is smaller than a predetermined opening threshold.

2. The monitoring system of claim 1, wherein the detection device further comprises two fixed sensors, and the control unit determines that both doors of the car are in the correct position if the control unit simultaneously receives a detection signal from both sensors while the car passes through the control zone.

3. The monitoring system of claim 1, wherein the detection device further comprises a single fixed sensor and the control unit determines that the gap is less than the predetermined opening threshold if the control unit receives a first detection signal from said sensor and then a second detection signal after a time that is less than a maximum time.

4. The monitoring system of claim 3, wherein the control unit monitors the position of the car in the control zone to determine the maximum time.

5. The monitoring system of claim 1, wherein if the control unit determines that the two doors are not well positioned when the car passes through the control zone, the system signals a door opening failure of the doors of the car.

6. The monitoring system of claim 5, wherein the control unit issues a command to stop the car in case of a door opening failure of the doors.

7. The monitoring system of claim 1, wherein the targets are passive and do not require a power supply.

8. The monitoring system of claim 1, wherein the targets are magnetic targets and the sensors are magnetic proximity detectors.

9. The monitoring system of claim 1, wherein the targets are metallic targets and the sensors are inductive proximity detectors.

10. The monitoring system of claim 1, wherein the targets are reflective targets and the sensors are photoelectric detectors.

11. The monitoring system of claim 1, wherein the doors of the car are sliding doors.

12. The monitoring system of claim 1, wherein the doors of the car are swiveling doors.

13. An overhead cable transportation system of the cable car type comprising a plurality of cars, wherein the transportation system comprises the monitoring system of claim 1 for monitoring the position of the doors of the cars of the system.

* * * * *